United States Patent [19]
Kristensen et al.

[11] Patent Number: 6,138,052
[45] Date of Patent: Oct. 24, 2000

[54] PRODUCT FORMING APPARATUS HAVING COMPUTER-BASED DEVICE FOR NON-CONTACT GAUGING OF A PRODUCT SIZE

[75] Inventors: Rick Bagge Kristensen, Yellow Springs; Robert Jerome Hadick, Centerville, both of Ohio

[73] Assignee: BetaLaser Mike, Inc., Dayton, Ohio

[21] Appl. No.: 08/796,432

[22] Filed: Feb. 10, 1997

[51] Int. Cl.[7] .................................................. G06F 19/00
[52] U.S. Cl. .............................. 700/117; 700/97; 700/98; 700/119; 700/114; 345/419; 345/420; 345/421; 345/425
[58] Field of Search ..................................... 345/419, 420, 345/421, 425; 340/947, 948, 950, 969; 700/96, 97, 98, 114, 117–119

[56] References Cited

U.S. PATENT DOCUMENTS

| | | | |
|---|---|---|---|
| 4,821,200 | 4/1989 | Oberg | 364/474.24 |
| 5,140,937 | 8/1992 | Yamane et al. | 118/695 |
| 5,216,616 | 6/1993 | Masters | 364/474.24 |
| 5,293,557 | 3/1994 | Fujinaga et al. | 364/578 |
| 5,303,141 | 4/1994 | Batchelder et al. | 364/149 |
| 5,481,465 | 1/1996 | Itoh et al. | 364/468 |
| 5,552,992 | 9/1996 | Hunter | 364/468.25 |
| 5,838,567 | 11/1998 | Boggio, Jr. | 364/468.28 |

*Primary Examiner*—William Grant
*Assistant Examiner*—Ramesh Patel
*Attorney, Agent, or Firm*—R. William Graham

[57] ABSTRACT

An apparatus and method for forming product using a computer-based device for non-contact gauging a product size of a forming product in an aperture environment having measurement inhibiting matter, a device forming product having a product size controller, a scanning device for generating a scan signal indicative of the product size, a computer-based device having an amplifying device for amplifying the scan signal in a manner to readily permit analysis thereof, software and hardware for receiving and analyzing the amplified signal and generating an output indicative of product size in response thereto and software and hardware operably associated with the receiving, analyzing and generating software and hardware for actuating the control software and hardware of the product forming apparatus in accordance with the output.

13 Claims, 3 Drawing Sheets

PRODUCT FORMING APPARATUS HAVING COMPUTER-BASED DEVICE FOR NON-CONTACT GAUGING OF A PRODUCT SIZE

BACKGROUND OF THE INVENTION

1. Field of the Invention

The present invention relates generally to the field of machines used for forming products, such as extruded or drawn products, wherein the product size requires uniformity. More particularly, the invention relates to a product forming apparatus having computer-based device for non-contact gauging of a product size.

2. Related Art

Presently, there exist techniques for measuring the size of a product during its formation without contacting the surface thereof. Such techniques are used in wire drawing, cable insulating, fiber production, metal tube and bar forming, centerless grinding, paper tube, hose and tube extrusion and continuous vulcanization. Some techniques employ a device which produces an analog signal which ideally exhibits a square wave form, wherein the drop in the wave indicates the portion of the signal representing the product size.

A problem which exists with such devices resides in signal interference due to harsh environments, such as, particles of dust, dirt, oil, scale, swarf, lubricant, condensate, film or moisture or temperature between the signal source and the signal receiver in addition to the product causing so much noise in the signal to render it unusable for the purpose intended. In view of this, the current devices require intermittent cleaning and/or maintenance and still remain relatively inaccurate in their ability to form a consistently sized product. Accordingly, the product consistency is poor which and leads to unwanted waste.

There is therefore a need to overcome the problems which exist with current continuous product forming devices. There is also a need to provide a device which can relatively accurately measure product size in a harsh environment.

BRIEF SUMMARY OF THE INVENTION

It is an object to improve the field of formed products.

It is another object to improve the method and device for non-contact measuring in a product forming apparatus.

It is yet another object to provide a dynamic non-contact device for measuring in harsh environments.

Accordingly, one aspect of the invention is directed to a product forming apparatus having computer-based device for non-contact gauging of a product size of a forming product in an aperture environment having measurement inhibiting matter, which includes means for forming a product and having means for controlling product size, means operably associated with the forming means for scanning and generating a scan signal indicative of the product size, computer-based means having means operably associated with said scanning means for amplifying the scan signal in a manner to readily permit analysis thereof, means operably associated with said amplifying means for receiving and analyzing the amplified signal and generating an output indicative of product size in response thereto and means operably associated with the receiving, analyzing and generating means for actuating the control means of the product forming apparatus in accordance with the output.

Another aspect of the invention is directed to a method of forming a product in a manner to have a relatively consistent size in an environment having measurement inhibiting matter, which includes the steps of initiating an apparatus for forming a product which has means for controlling product size, generating a scan signal about a forming product indicative of the product size, amplifying the scan signal in a manner to readily permit analysis thereof, using a computer based device for receiving and analyzing the amplified signal and generating an output signal indicative of product size in response thereto and means operably associated with the receiving, analyzing and generating means for actuating the control means of the product forming apparatus in accordance with the output signal.

By so doing, the present invention provides for a higher product quality, less waste and cost, higher speed of production and less environment sensitivity. Other objects and advantages will be readily apparent to those skilled in the art upon viewing the drawings and reading the detailed description hereafter.

DETAILED DESCRIPTION OF AN EMBODIMENT THE INVENTION

Figure 1:
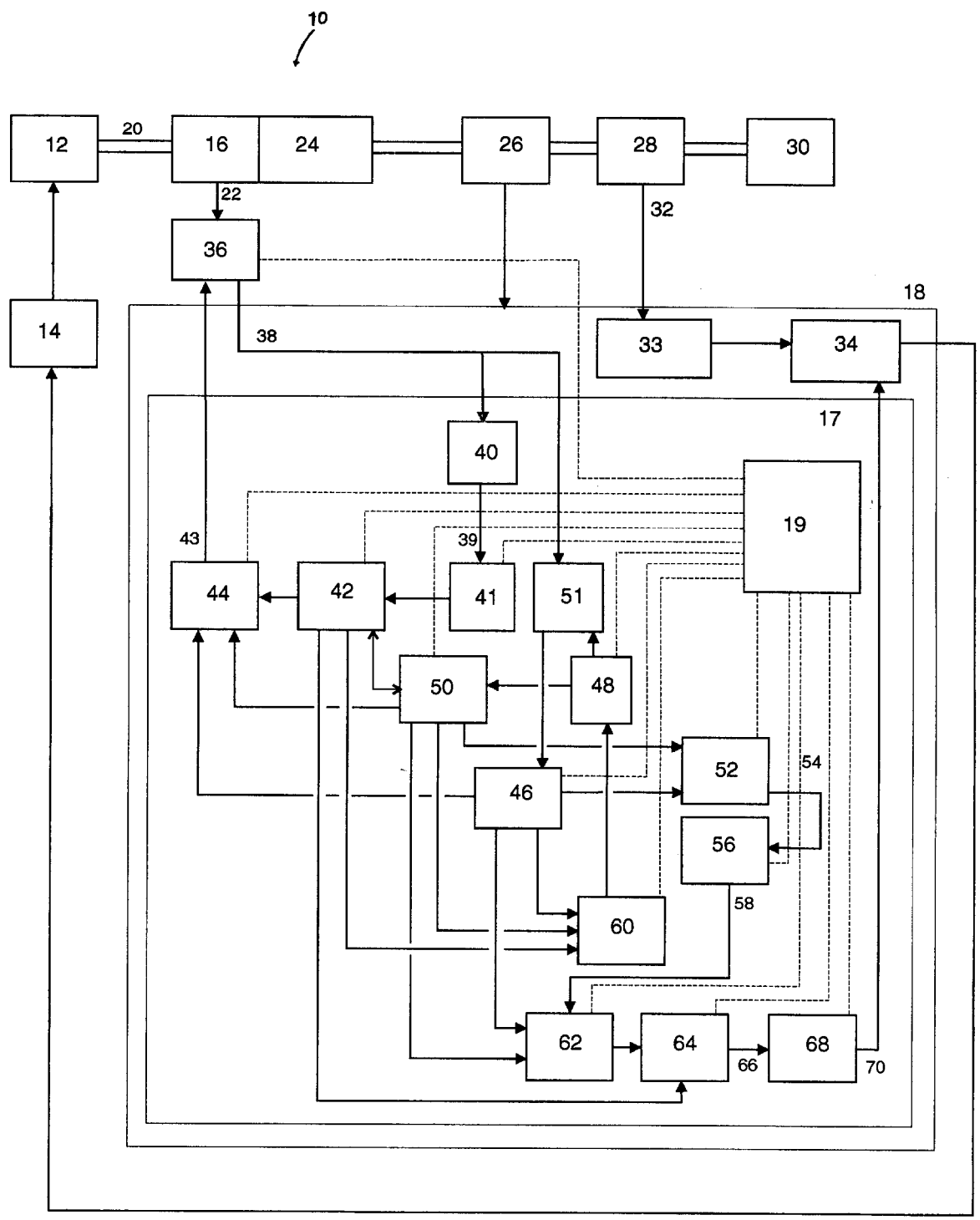
FIG. 1 is a block diagram of the present invention.
Figure 2:
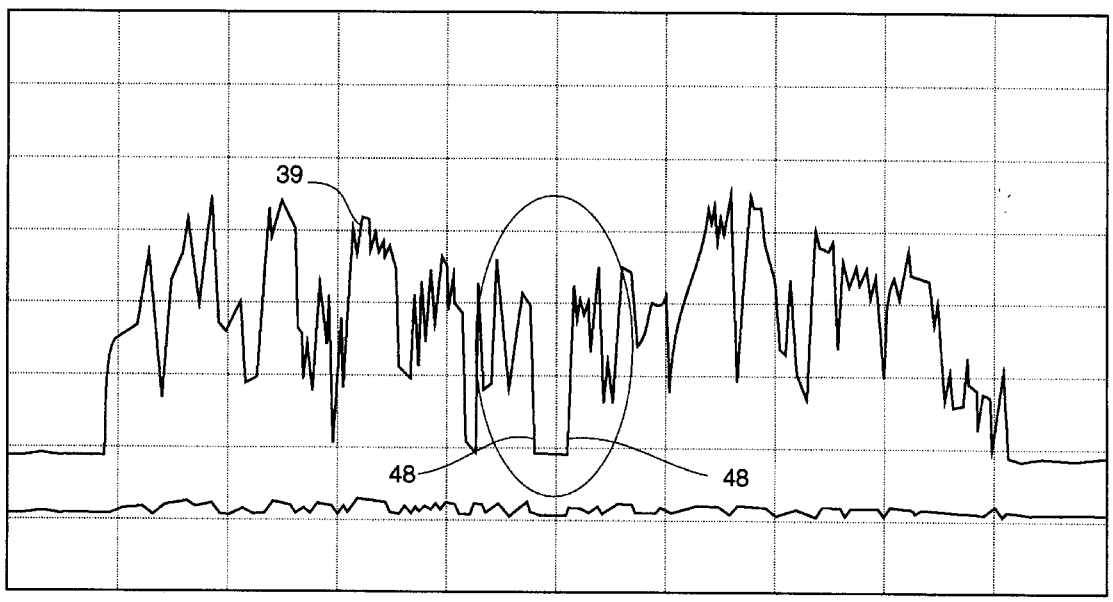
FIG. 2 is schematic of a scan signal of the present invention.
Figure 3:
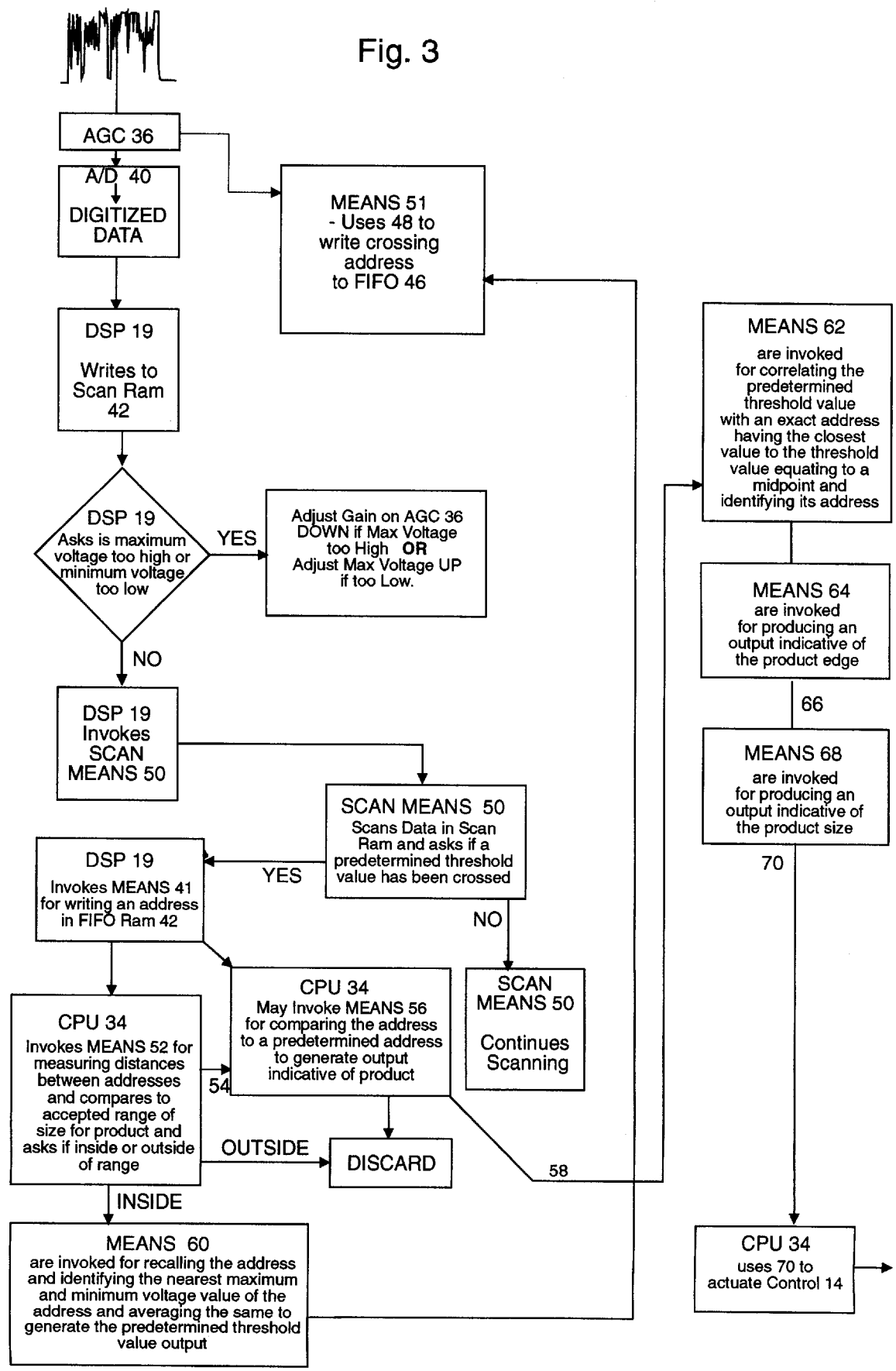
FIG. 3 is a flow chart illustrating the present invention.

Referring now to the drawings, the present invention relates to an apparatus 10 for use in forming a product, such as cable insulating, wire drawing, fiber production, metal tubing and bar production, forging, centerless grinding, paper tubing, extrusion of hose and tube and continuous vulcanization, for example. The product forming apparatus 10 includes an extruder 12 with a control mechanism 14 connected thereto of the type known in the art. The apparatus 10 has a signal generator 16 operably associated with the extruder 12. Also, a computer-based device 18 is operably connected to the signal generator 16 and control mechanism 14 for actuating the same as hereinafter described.

The conditions of operation of the product forming apparatus 10 are often carried out in a harsh environment, which includes dirt, dust, water, oil, scale, swarf, lubricants, steam, condensate, film and vapors, for example. The signal generator 16, a signal produced by a laser scanner (analog), for example, is utilized to scan a forming product 20 and generate a signal 22. Instead of a laser, it is contemplated that other techniques such as CCD array may be employed. The signal 22 will likely include noise representing the dirt, dust, water, oil, scale, swarf, lubricants, steam, condensate, film and vapors, referred to hereinafter "measurement inhibiting matter" in the scan.

The product forming apparatus 10 also includes a harsh environment 24 to receive forming product 20 therethrough, wherein the signal generator 16 is installed in a region of the harsh environment 24 adjacent the extruder 12. Adjacent to another end of the harsh environment 24 are a product length counter 26 which is operatively connected to the computer-based device 18 for use by in controlling product formation, a cold scanner 28 operatively connected to the computer-based device 18 and capstan 30 which are preferably disposed in the order presented. The cold scanner 28 is also preferably a signal generated by a laser scanner (analog) which also generates a signal 32 which can be similarly used by the computer based device 18 for comparison.

The computer-based device 18 includes and digital signal processing scan card 17, having a digital signal processor (DSP) 19 operatively connected to an automatic gain control (AGC) circuit 36 which is operatively connected to the signal generator 16 to receive and manipulate the scan signal 22 and generate an amplified scan signal 38 in a manner to readily permit analyzing thereof by monitoring and compensating the signal 22 as needed. This is accomplished by the AGC 36 amplifying the signal 22 and DSP 19 searching for maximum voltage values as compared to predetermined range voltage values as follows.

The DSP 19 is operatively connected to an analog to digital (A/D) converter 40 which is operatively connected to the AGC circuit 36 for receiving the amplified scan signal 38 and digitizing the same to form digitized voltage data 39 at a constant rate. The DSP 19 is operatively connected to means 41 for writing digitized data 39 into a Scan RAM 42. The DSP 19 analyzes the digitized data for maximum voltage values and is operatively connected to means 44 which in turn is operatively associated with the Scan RAM 42 for comparing the digitized data 39 to a predetermined range of voltage so that the DSP 19 can actuate the AGC circuit 36 via gain signal 43 accordingly, i.e., if the maximum voltage is too high, the gain is decreased a small amount and if the maximum voltage is too low the gain is increased a small amount (as determined by predefined threshold values). This process is carried out on a scan by scan basis.

Also, included are means 50 operatively associated with the DSP 19 and the writing means 41 and Scan RAM 42 for scanning the data for rising and falling portions (voltages) of the signal 39 which are indicative of edges of an aperture and falling and rising portions (voltages) of the signal indicative of product edges whereby the size of the product can be determined.

Means 51 are operatively associated with AGC 36, means 60 and FIFO RAM 46 to receive amplified signal voltage 38 and write to FIFO RAM 46 a crossing address each time the signal voltage 38 crosses a predetermined threshold value output 48 indicating an edge of the product or aperture. A first rising crossing address corresponds to a last falling crossing address, and each pair of failing and rising crossing address corresponds to the product or measurement inhibiting matter.

Means 52 are operatively associated with DSP 19 and FIFO RAM 46 for measuring a distance between each pair falling and rising crossing address of the signal (after the first rising crossing address) and comparing the distance with a predetermined threshold product size range to generate an output 54 indicative of one of the product size and the measurement inhibiting matter. Output 54 is used by means 56 described hereinafter.

Additional means 56 are operatively associated with means 52 and may optionally be invoked for comparing an address of the output 54 with an address which has been predetermined to be an appropriate address for the product and generating an output 58 indicative of the product edge size. In this regard, it may be desirable to invoke the use of FIFO RAM 46 when there exists a less harsh environment (a cleaner environment), wherein less data is needed to obtain an accurate reading and hence increase the rate of performance of the apparatus 10.

Means 60 are operably associated with DSP 19, the Scan RAM 42, the FIFO RAM 46 and writing means 50 for recalling a first address and identifying a nearest maximum and minimum voltage value on either side of the first address value and averaging the nearest maximum and minimum values to generate the first predetermined threshold value output 48 used by means 50. This is a repetitive process such that the predetermined threshold value output 48 is generated.

Means 62 is operably associated with the DSP 19, means 56, means 60, Scan RAM 42 and the FIFO RAM 46 for correlating the first predetermined threshold value output 48 with an actual crossing address having the closest value to the predetermined threshold value output 48 and identifying this as the midpoint. Likewise, this is done for each predetermined threshold value and address to find midpoint values. Also, the output 58 is used by means 62.

Means 64 are operably associated with the DSP 19 and correlating means 62 for producing an output 66 indicative of a product edge address and which derives a best fit curve about each product midpoint value, using a least square's formula over a predetermined range about each product midpoint value, for example, knowing that the data is collected and stored at the predetermined constant rate, and interpolates between a voltage value on one side of the midpoint value and another voltage value on another side of the midpoint value to generate the output 66 indicative of the product edge. This is repeated to produce each product edge.

Means 68 is operably associated with means 64 for producing an output 70 indicative of the product size and which derives the distance between a first product edge and a second product edge. This is repeated for each subsequent data pair of product edges and the distances are averaged by the means 68 to produce the output 70 indicative of product size.

The CPU 34 uses the output 70 in actuating the control mechanism 14 of the extruder 12. Optionally, the output 70 may be used to manually actuate control means 14. By so doing, the present invention provides a more reliable machine for producing extruded materials or the like.

The computer-based device 18 may also include an analog processing scan card 33, as is known in the art, for receiving the signal 32 and generating an output indicative of the product size. The CPU 34 can likewise use this output in actuating the control mechanism 14 of the extruder 12. Alternatively, another digital signal processing scan card could be used to receive signal 32 and generate an output indicative of the product size.

The above described embodiment is set forth by way of example and is not for the purpose of limiting the present invention. It will be readily apparent to those skilled in the art that obvious modifications, derivations and variations can be made to the embodiment without departing from the scope of the invention. Accordingly, the claims appended hereto should be read in their fill scope including any such modifications, derivations and variations.

What is claimed is:

1. A continuous product forming apparatus having computer-based device for non-contact gauging of a product size of a forming product in an aperture environment having measurement inhibiting matter, which includes:

means for forming product and having means for controlling product size;

means operably associated with said forming means for scanning size of said forming product and generating a scan signal indicative of the product size;

means for amplifying said scan signal in a manner to readily permit analysis thereof; said amplifying means including an automatic gain control (AGC) circuit; and computer-based device operably associated with said scanning means and said amplifying means for receiving and analyzing said amplified signal and generating an output indicative of product size in response thereto;

wherein said computer-based device includes means for transforming said signal into digitized voltage data and means for writing said digitized voltage data into a Scan RAM of said computer based device at a preselected interval.

2. The continuous product forming apparatus of claim 1, which further includes means operably associated with said receiving, analyzing and generating means for actuating said controlling means of said product forming apparatus in accordance with said output.

3. The continuous product forming apparatus of claim 1, wherein said computer-based device includes a digital signal processing scan card.

4. The continuous product forming apparatus of claim 1, wherein said computer-based device includes means operatively associated with said writing means and said Scan RAM for analyzing said digitized voltage data for maximum voltage values, comparing said digitized voltage data to a predetermined range of voltages and actuating said AGC circuit in accordance therewith.

5. The continuous product forming apparatus of claim 1, wherein said computer-based device includes means operatively associated with said writing means and said Scan RAM for scanning said amplified signal for rising and falling values and causing said writing means to write a crossing address into a FIFO RAM each time said signal crosses a predetermined threshold value and generating an output indicating one of an edge of the product and an edge of the aperture.

6. The continuous product forming apparatus of claim 5, wherein said computer-based device includes means operatively associated with said FIFO RAM for measuring a distance between a falling crossing address and associated rising crossing address of said crossing addresses and comparing a distance therebetween with a predetermined threshold product size range to generate an output indicative of one of the product size and the measurement inhibiting matter.

7. The continuous product forming apparatus of claim 6, wherein said computer-based device includes means are operatively associated with said Scan RAM and FIFO RAM for comparing said crossing addresses with an address which has been predetermined to be an appropriate address for said product and generating an output indicative of one of said product and said measurement inhibiting matter.

8. The continuous product forming apparatus of claim 1, wherein said computer-based device includes means are operatively associated with said Scan RAM for correlating said data with an address which has been predetermined to be an appropriate address for said product and generating an output indicative of one of said product and said measurement inhibiting matter.

9. The continuous product forming apparatus of claim 1, wherein said computer-based device includes means operably associated with said Scan RAM and said writing means for recalling a first crossing address and identifying a nearest maximum and a nearest minimum voltage value on either side of said first crossing address value and averaging said nearest maximum and minimum values to generate a first predetermined threshold value output used by said computer-based device.

10. The continuous product forming apparatus of claim 9, wherein said computer-based device includes means operatively associated with said writing means and said Scan RAM for scanning data for rising and falling values and causing said writing means to write a crossing address into a FIFO RAM each time said data crosses a predetermined threshold value and generating an output indicating one of an edge of the product and an edge of the aperture and includes means operably associated with said recalling and averaging means, said Scan RAM and said FIFO RAM correlating said first predetermined threshold value output with an actual crossing address having a closest value to said predetermined threshold value output and identifying this as a midpoint.

11. The continuous product forming apparatus of claim 10, wherein said computer-based device includes means operably associated with said correlating means, said Scan RAM and said FIFO RAM producing an output indicative of a product edge address and which derives a best fit curve about said midpoint over a predetermined range about each product midpoint and interpolating between a voltage value on one side of said midpoint value and another voltage value on another side of said midpoint value to generate an output indicative of a product edge.

12. The continuous product forming apparatus of claim 11, wherein said computer-based device includes another means operably associated with said producing means for producing an output indicative of the product size and which derives a distance between a first product edge and a second product edge, and a third product edge and a fourth product edge such that said distance is averaged by the means to produce the output indicative of product size.

13. A continuous product-forming apparatus having computer-based device for non-contact gauging of a product size of a forming product in an aperture environment having measurement-inhibiting matter, said apparatus comprising:

means for forming product and having means for controlling product size;

means operably associated with said forming means for scanning size of said forming product and generating a scan signal indicative of the product size;

means for amplifying said scan signal in a manner to readily permit analysis thereof;

computer-based device operably associated with said scanning means and said amplifying means for receiving and analyzing said amplified signal and generating an output indicative of product size in response thereto, said computer-based device including means for transferring said signal into digitized voltage data;

and means for writing said digitized voltage data into a Scan RAM of said computer-based device at a preselected interval.

* * * * *